UNITED STATES PATENT OFFICE.

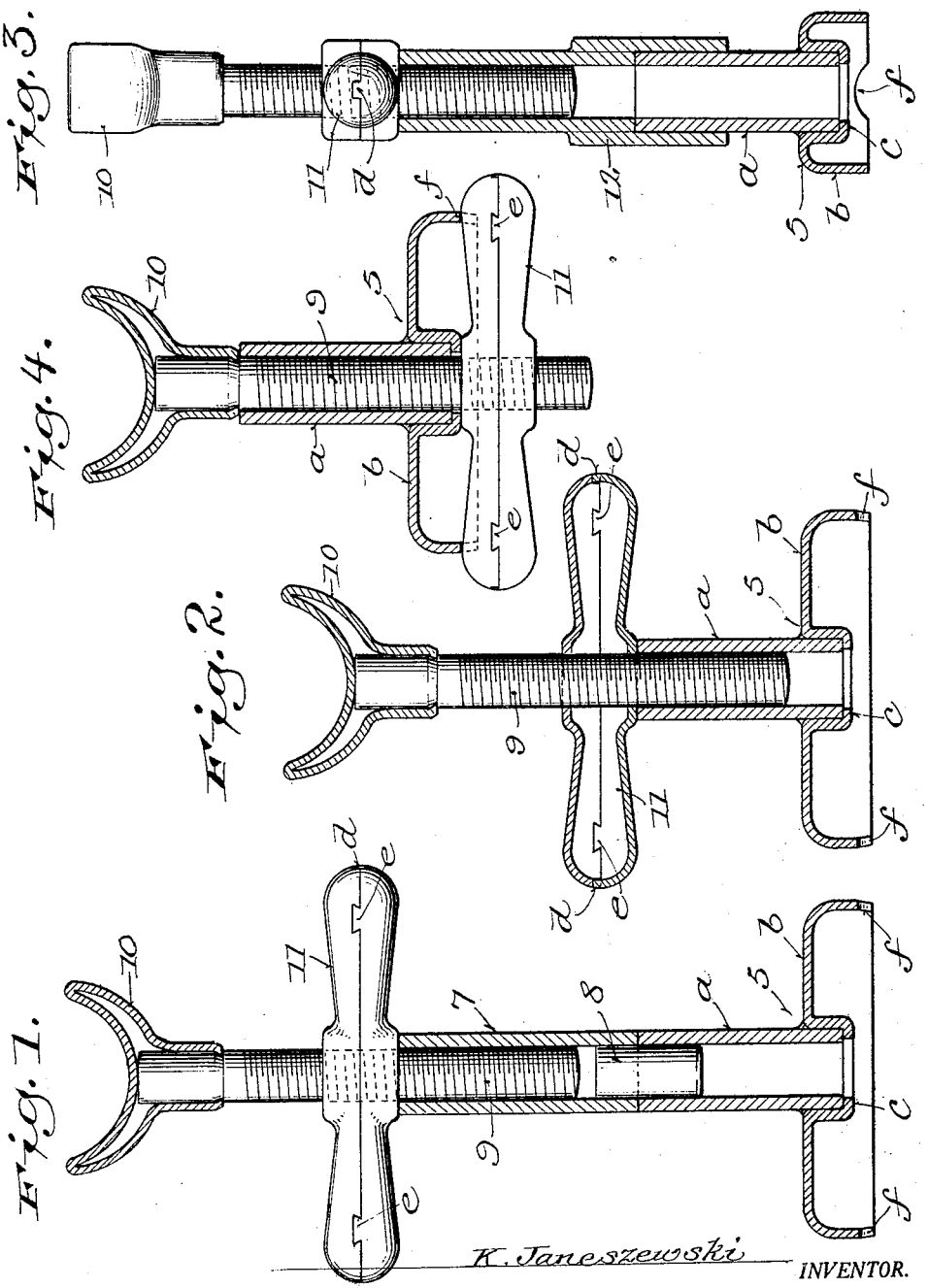

KASIMIR JANESZEWSKI, OF MILWAUKEE, WISCONSIN, ASSIGNOR TO STERLING TOOL & MANUFACTURING COMPANY, OF MILWAUKEE, WISCONSIN, A CORPORATION OF WISCONSIN.

JACK FOR MOTOR CYCLES.

1,403,690.   Specification of Letters Patent.   Patented Jan. 17, 1922.

Application filed August 19, 1920. Serial No. 404,554.

*To all whom it may concern:*

Be it known that I, KASIMIR JANESZEWSKI, a citizen of the United States, and resident of Milwaukee, in the county of Milwaukee and State of Wisconsin, have invented certain new and useful Improvements in Jacks for Motor Cycles; and I do hereby declare that the following is a full, clear, and exact description thereof.

My invention relates to new and useful improvements in lifting jacks, and is more particularly directed to the provision of a jack device which may be selectively associated with various parts of a motorcycle and side-car structure, for raising the same from the ground to permit replacement or adjustment of the tires of the cycle or side-car.

It is in general the object of my invention to provide a simple and readily operated device for this purpose, which may be most readily adapted for its selective lifting operations, and which when not in use, may occupy a minimum amount of space to permit its convenient storage.

I have found it most expedient to jack up the motorcycle structure by engagement with the intermediate portion thereof to lift either wheel from the ground, and to jack up the side-car wheel by engagement with the axle thereof. Inasmuch as the side-car wheel axle is disposed at a greater elevation than the jack-engaging portions of the cycle structure, it is necessary to provide for different ranges of lifting adjustment of the jack-screw, and it is more particularly an object of my invention to provide an arrangement whereby the jack screw may be mounted at different elevations to initiate its ready movement for engagement with the selective parts to be lifted.

With the above and other objects and advantages in view, my invention resides more particularly in the novel combination, formation and arrangement of parts hereinafter described and pointed out in the appended claims.

In the accompanying drawings—

Figure 1 is a vertical sectional view through a jack structure embodying my invention and showing the jack-screw mounted at its greater elevation for engaging the axle of a side-car;

Figure 2 is a similar view showing the jack-screw mounted in its lower position for engagement with the cycle frame structure;

Figure 3 is a view similar to Figure 1, but showing a modified upper support section for the jack-screw, and Figure 4 is a view showing the jack assembled for packing.

Referring now more particularly to the accompanying drawings, my improved jack device for motorcycles comprises a lower support section 5 in the form of a sleeve having a foot enlargement $b$ at its lower end adapted to seat on the ground. In forming the lower support section, I preferably form the foot enlargement $b$ from a stamping of sheet metal having a central cup-shaped depression and I set a pipe section $a$ in this cup-shaped depression, the bottom of the depression being cut away inwardly of its periphery to provide a continuation of the bore of the pipe, the ends of the pipe however seating against ledge portions $c$ of the depression, the pipe being thus held by the metal of the depression against downward or lateral movement, and to permanently anchor the pipe in this position I set a ring of material about the pipe at the edge of the depression and then weld said ring of material, thus insuring a rigid structure although major stresses exerted in rough handling of the structure would be transmitted through the walls of the depression rather than through the weld connections. I thus provide an exceedingly simple and economical construction. An upper support section is provided in the form of a pipe section or sleeve 7 having its bore substantially equal in diameter to the diameter of the bore of the lower support section 5, the sleeve 7 having a cylindrical bar 8 shrunk or otherwise secured in the lower portion of its bore and extending outwardly therefrom for engagement in the bore of the lower sleeve $a$ whereby the sleeve 7 may be securely mounted on the sleeve $a$ in end abutment therewith. A jack-screw 9 is provided having a forked seat enlargement 10 at its upper end and this screw has slidable bearing engagement in the sleeve 7 when the device is adapted for lifting the side-car wheel, or in the sleeve $a$ when the device is adapted for lifting one of the motorcycle wheels.

A handle member 11 is threaded on the jack-screw and is adapted in its screw-elevating movement to bear against the end of either of the sleeves $a$ and 7. This handle member is formed from a pair of mating stampings each formed in trough shape and with their edge portions in abutment. Each stamping carries at one end a lug *d* projecting from its edge and engaging in a corresponding recess in the end of the other stamping member. Each stamping member is further provided in one side with one or a plurality of dovetailed recesses and is provided at its other side with dovetailed tongues *e* projecting from its longitudinal edge and adapted to engage in the corresponding dovetailed recesses of the other stamping member. Both stamping members may be thus formed from a single set of dies and in assembling the handle, said members are placed with their edges in abutment, the dovetailed tongues *d* being inclined outwardly and the dovetailed tongues are then bent inwardly into the dovetailed recesses to thus lock the parts together. The intermediate portions of the stamping sections are threaded for the screw when assembled.

When it is desired to lift the side-car wheel, the upper support section is secured on the lower section, the jack-screw is seated in the sleeve 7 and the handle nut 11 is rotated in bearing engagement with the upper end of the sleeve to effect the jacking operation. When it is desired to lift one of the motorcycle wheels by engagement with a relatively low motorcycle structure, the use of the upper support section is dispensed with and the jack-screw is seated directly in the lower support section sleeve 5, with the hand-nut bearing on the end of said sleeve 5. I have thus provided an exceedingly simple, readily adjustable and readily operable device for the selective uses described.

In Figure 3 a modified structure is shown wherein the upper support section for the jack-screw is in the form of a sleeve 12 having its lower end portion enlarged in both internal and external diameter and adapted to receive the upper end portion of the lower support sleeve 5 whereby the bores of the upper and lower sections are mutually continuous forming a single passageway, and in this structure, the screw 9 in its lowermost position may pass entirely through the restricted bore of the upper support sleeve and may if necessary extend into the bore of the lower support sleeve, this arrangement being particularly desirable in the event that a wide range of adjustment of the jack-screw is desirable in either of its selective operating positions.

When the jack structure is not in use, all of its parts, with the exception of the extension sleeve 12, may be connected rigidly together to provide a compact structure facilitating shipping the jack and to facilitate storage in a tool-kit or the like, by removing the handle 11 from the screw and placing the handle member in the concavity of the base foot 6, the end walls of the base stamping being recessed at *f* to receive the ends of the handle, and the screw is passed through the sleeve *a* and threaded in the handle until the shoulder of the seat enlargement 10 has clamping engagement with the end of the sleeve *a*.

While I have shown and described a preferred embodiment of my invention, it will be understood that various changes and modifications of structure may be employed to meet differing conditions of use and manufacture without departing in any manner from the spirit of my invention.

What is claimed is:

1. A jack device of the class described comprising a support sleeve, a foot member connected with the lower end of the support sleeve, a jack-screw slidable in the support sleeve, a seat enlargement carried by the jack-screw, and a hand-nut threaded on the jack-screw and adapted for disposition thereon at either end of the support sleeve.

2. A jack device of the class described comprising a support sleeve, a foot member connected with the lower end of the support sleeve, a jack-screw slidable in the support sleeve, a seat enlargement carried by the jack-screw, and a hand-nut threaded on the jack-screw and adapted for disposition thereon at either end of the support sleeve, said foot member and hand-nut being adapted for interfitting engagement when the nut is threaded on the screw at the lower end of the support sleeve whereby to hold the parts against relative movement.

3. A jack device of the class described comprising a support sleeve, a foot member connected with the lower end of the support sleeve and having its lower portion concave, a jack-screw slidable in the support sleeve, a seat enlargement carried by the jack-screw, and a hand-nut threaded on the jack-screw and adapted for disposition thereon at either end of the support sleeve, said hand-nut being engageable in the concavity of the foot member to hold the parts against relative movement.

4. A jack device of the class described comprising a foot member formed of sheet metal having downturned peripheral portions and provided with an intermediate cup-shaped depression, a support sleeve member seated in said depression, the bottom of the depression being cut away inwardly of its periphery to form a continuation of the bore of the sleeve member, said sleeve member being fitted against the wall of the cup-shaped depression, a fused connection between the sleeve member and the foot member, a jack-screw slidable in the sleeve member, and a hand-nut on the jack-screw engageable with the sleeve member.

5. A jack device of the class described comprising a support sleeve, a foot enlargement on the lower end of the support sleeve, a jack-screw slidable in the support sleeve, a hand-nut comprising a pair of mating trough-shaped sections having their edges in mutual engagement and having their intermediate portions threaded to receive the jack-screw, and means for holding said trough-shaped sections together.

6. A jack device of the class described comprising a support sleeve, a foot enlargement on the lower end of the support sleeve, a jack-screw slidable in the support sleeve, a hand-nut comprising a pair of mating trough-shaped sections having their edges in mutual engagement and having their intermediate portions threaded to receive the jack-screw, interfitting lug and recess portions at the ends of the trough-shaped member, and interfitting dovetailed lug and recess portions at the sides of the trough-shaped member.

7. In a device of the class described, a jack device, comprising a foot member of elongated shape and made of metal having down struck peripheral flange portions, an intermediate portion forming a cup-shaped depression having the bottom thereof cut away inwardly of its periphery to provide an annular flange surrounding the bore thereof, said down struck peripheral flange portions being oppositely recessed at the ends of said foot member, a support sleeve member seated in said cup-shaped depression, said sleeve member being fitted against the wall of said depression having its lower end abutting the flange surrounding the bore of the depression with which the bore of said sleeve member forms a continuation, a fused connection between the sleeve member and the foot member, a jack-screw freely slidable in the sleeve member, and a hand-nut threaded on the jack-screw and adapted for disposition thereon at either end of the device, said hand-nut nesting in the recesses of said down struck flange portions when said hand-nut is mounted on the end of the jack-screw adjacent said foot member whereby the device may be stored away and occupy a minimum amount of space.

8. A jack device, a foot member made of metal having down struck peripheral flange portions, an intermediate cup-shaped portion struck therefrom and having its bottom apertured, said down struck peripheral flange portions having opposite ends thereof recessed, a supporting sleeve member seated in said cup-shaped portion, said sleeve member having its lower end fitted in said cup-shaped portion with its bore registering with the recess in the bottom of said portion, a jack screw freely slidable in the sleeve member and a hand nut threaded on the jack screw and adapted for disposition thereon at either end of the device, said hand nut nesting in the recess of said down struck flange portions when said hand nut is mounted on the end of the jack screw adjacent said front member whereby the device may be stored away and occupy a minimum amount of space.

In testimony that I claim the foregoing I have hereunto set my hand at Milwaukee, in the county of Milwaukee and State of Wisconsin.

KASIMIR JANESZEWSKI.